Jan. 28, 1964  J. D. AINSWORTH  3,119,959
DETECTION OF MIS-FIRE IN MERCURY ARC
RECTIFIER AND INVERTER SYSTEMS
Filed Dec. 21, 1960

INVENTOR
JOHN DESMOND AINSWORTH

BY
Stevens, Davis, Miller & Mosher

ATTONEYS

United States Patent Office 3,119,959
Patented Jan. 28, 1964

3,119,959
DETECTION OF MIS-FIRE IN MERCURY ARC RECTIFIER AND INVERTER SYSTEMS
John Desmond Ainsworth, Stafford, England, assignor to The English Electric Company Limited, London, England, a British company
Filed Dec. 21, 1960, Ser. No. 77,412
Claims priority, application Great Britain Jan. 1, 1960
7 Claims. (Cl. 321—12)

This invention relates to the detection of mis-fire in mercury arc rectifier and inverter systems and is particularly concerned with the detection of mis-fire in individual valves of a mercury arc rectifier or inverter, hereinafter collectively referred to as a mercury arc converter.

Mis-fire, when applied to the valve itself as opposed to the complete converter, refers to the condition where the valve refuses to conduct current in spite of having sufficiently positive grid and anode voltages. It can occur, for example, due to excitation arc failure.

According to the invention, apparatus for the detection of mis-fire in the valve of a mercury arc converter comprises first circuit means for generating an electrical signal having a condition indicative of the magnitude of the anode to cathode voltage of the valve relative to the minimum anode to cathode voltage normally required to fire the valve, second circuit means for generating an electrical signal having a condition indicating that the grid to cathode voltage of the valve is more positive than the normal minimum grid to cathode voltage for firing the valve, detector means sensitive to both said signals and operative when the signals simultaneously have conditions indicating respectively an anode to cathode voltage and a grid to cathode voltage in excess of the respective normal minimum voltages for firing the valve, and time-delay relay means for controlling an indicator or protective device in response to the operation of the detector means when the latter operation is sustained for a period in excess of the normal firing delay of the valve.

A preferred form of apparatus according to the invention, applied to a mercury arc rectifier installation will now be described, by way of example, with reference to the accompanying drawings, in which.

Figure 1:
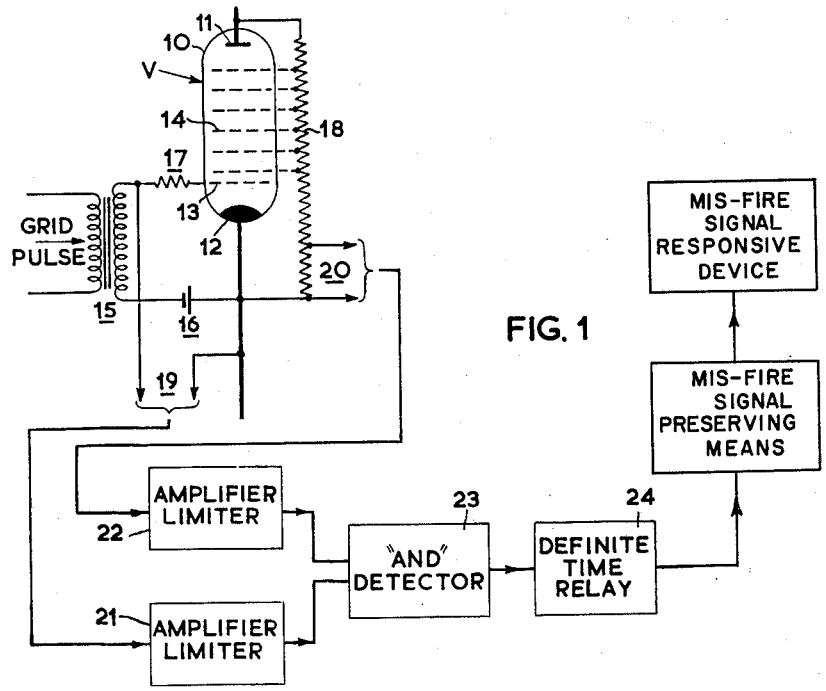
FIG. 1 is a block schematic diagram of the apparatus.

Referring to FIG. 1, a valve V of a mercury arc rectifier installation is shown schematically by an envelope 10 housing an anode 11, a cathode 12 formed by a pool of mercury, and a series of grids comprising a control grid 13 and voltage grading grids 14. The valve has its anode to cathode circuit connected in some suitable manner not shown in the drawing and is controlled by a grid control signal supplied to the primary winding of a transformer 15. The secondary winding of this transformer 15 is connected to be biased by some voltage source denoted 16 and supplies the control grid signal for the valve V through a resistor 17 to the grid 13. A potential divider resistor 18 is connected between the anode 11 and the cathode 12 and has a plurality of tapping points along its length connected to the grids 14 as shown. This potentiometer and grid arrangement serves to control the voltage gradient in the discharge in the valve V and conduction is allowed by the application of a firing pulse through the transformer 15. The resistor 17 merely serves to limit the grid current. Thus under conditions of mis-fire there is no potential drop across the resistor 17 and the potential drop supplied along lines 19 connected as shown between the cathode of the valve V and the grid supply end of the resistor 17 will be a measure of the grid to cathode voltage of the valve under mis-fire conditions. The potential drop across the resistor 18 is the anode to cathode voltage of the valve and under mis-fire conditions when no current is diverted from the resistor 18 through the grids 14 the current in this resistor 18 will similarly be proportional to the anode to cathode potential. Accordingly, the signal is supplied along the output lines 20 connected respectively to the cathode of the valve V and to some suitable tapping connection along the resistor 18 to afford a measure of the anode to cathode potential under mis-fire conditions. Signals supplied along output lines 19 and 20 are fed to amplifier limiters 21 and 22 respectively. These amplifier limiters operate to produce a highly sensitive detection of a condition when the input signal exceeds a predetermined level, the output from the limiter having a magnitude indicative of this condition. Thus, for example, the amplifier limiter 22 may function to provide a normally negative near-zero output signal and this signal may change to become strongly negative in the event that the anode to cathode voltage indication provided by the input to the limiter 22 is in excess of 5% of the normal peak anode to cathode voltage. Also, the limiter 21 may operate to produce a strongly negative output signal only when the grid to cathode voltage is, say 50 volts in excess of the normal grid firing voltage (thus limiter 21 setting may be say 70 v. for a low voltage valve, and up to 150 v. for a 100 kv. valve). In this way, the outputs from the two limiters 21 and 22 together indicate a mis-fire condition in the valve V only when they are simultaneously strongly negative. Such a condition can be detected by the AND detector 23 which may have a conventional form well known in the digital computer art. The output from the AND detector 23 is then fed to a definite time delay relay 24 which is sensitive to the time duration of the output signal from the detector 23 and operative to provide the mis-fire indication signal if the AND indication has a duration in excess of a predetermined period. In a conventional 50 cycle per second system this period may for example be 200 microseconds. The definite time delay function of the relay 24 serves to cover the normal firing delay of the valve particularly when it is cold.

Figure 2:
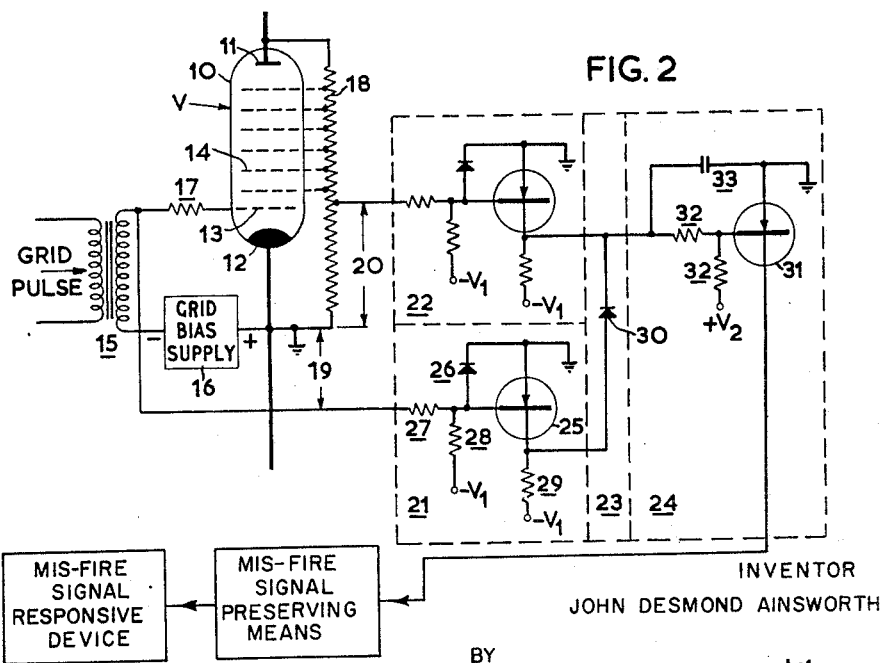
FIG. 2 is a detailed circuit diagram thereof.

FIG. 2 shows a circuit diagram working on the principles just outlined with reference to FIG. 1. The amplifier limiters 21 and 22, the AND detector 23 and definite time relay 24 are in this case shown to comprise a transistor circuit. In FIG. 2 the amplifier limiter 21 is shown to comprise a transistor 25 of the p-n-p- type. The transistor 25 has a grounded emitter and a diode 26 is connected between the base and emitter of the transistor as shown. This diode 26 operates to limit the positive rise of the base potential relative to the emitter potential. The input signal to the limiter 21 is supplied through a potential divider network comprising resistors 27 and 28. The common connection between these resistors supplies a signal to the base of the transistor 25 and the other end of the resistor 28 is connected to a negative bias potential source denoted $-V_1$. The output signal from the limiter 21 is supplied from the collector of the transistor 25 which is further connected by a resistor 29 to the same negative potential source $-V_1$.

In operation, the input signal to the limiter 21 is normally negative and accordingly the base of the transistor 25 is held negative so that the collector emitter circuit is conductive and the output from the limiter 21 therefore at a near zero value. When the positive grid pulse controlling the firing of the valve V is supplied to the transformer 15 then, depending upon the relative resistances of the resistors 27 and 28 and the bias potentials of the circuit, the base of the transistor 25 may be driven positive by an amount limited by the action of the diode 26 but sufficient to cut off the transistor. Under these conditions the output signal from the limiter 21 falls to the low value $-V_1$, that is, becomes strongly negative.

The amplifier-limiter 22 consists of components similar to those of the limiter 21 and is similarly operative to provide an output signal which is normally at a near zero value but which tends to fall to a strongly negative value when the excess voltage input control signal is supplied from the valve circuit.

The AND detector 23 merely consists of a diode 30. In the event that the output signal from the amplifier-limiter 22 tends to be strongly negative by the action just described diode 30 will act to prevent this if transistor 25 is allowed to conduct. However, diode 30 is ineffective if the output from the limiter 21 is strongly negative as well. Thus, the output supplied to the relay 24 by the detector 23 is only strongly negative when the appropriate over-positive inputs are applied to the limiters 21 and 23 simultaneously.

The relay 24 comprises a transistor 31 having an earthed emitter and a base connected to the common connection of two resistors 32 which form a potential divider. The input signal is supplied to one end of this potential divider and the other end of the potential divider is connected to a positive potential source $+V_2$. The value of $V_2$ is adjusted so that when the strongly negative signal is supplied as input the collector emitter circuit of the transistor becomes conductive and the output signal of the whole system is derived from the collector of the transistor 31. In this relay a time delay feature is provided by the action of the capacitor 33 connected between the input to the relay and the emitter of the transistor 31. The action of this capacitor 33 is to slow the establishment of the strongly negative input signal, so that a signal of a duration less than a prescribed value will not operate the relay, i.e. will not turn on transistor 31.

If required some special means may be provided such as an electromagnetic counter or a bi-stable circuit requiring manual reset in order to preserve the mis-fire indication in the event that the mis-fire signal is intermittent. It is further to be noted that the above described circuit will operate correctly in normal circumstances including starting, stopping and grid control. Also, it is to be noted that the circuits described are particularly suited where the valve V operates on a "broad-pulse" system, that is a system where the length of the grid pulse is equal to the nominal conduction period of the valve, ignoring commutation time. However, the mis-fire detector circuit of FIGS. 1 and 2 will operate similarly in a "narrow-pulse" system, except that if the D.C. load current is discontinuous, as it would be at low currents if the system were of the "broad-pulse" kind where there is more than one valve current pulse per cycle, then failure of the valve to pick up current on the extra pulses (when the grid pulse has vanished) will not be indicated as mis-fire. This is in fact correct, as such a condition is not a valve fault, but is inherent in a "narrow-pulse" system. A "narrow-pulse" system is one having grid firing pulses considerably shorter than in a so-called "broad pulse" system.

What I claim as my invention and desire to secure by Letters Patent is:

1. Apparatus for the detection of mis-fire in a mercury arc converter valve, said valve including an anode, a control grid and a cathode, comprising first comparator means including first circuit means connected between the said anode and cathode of the valve for producing a first electrical signal representing the magnitude and polarity of the anode-to-cathode voltage of the valve, second circuit means for producing a second electrical signal representing the magnitude and polarity of the minimum anode-to-cathode voltage normally required to fire the valve, and third circuit means connected to said first and said second circuit means and responsive to the relative magnitudes and polarities of said first and said second electrical signals for producing a third electrical signal having a condition indicative of said relative magnitudes and polarities; second comparator means including fourth circuit means connected between the grid and cathode for producing a fourth electrical signal representing the magnitude and polarity of the grid-to-cathode voltage of the valve, fifth circuit means for producing a fifth electrical signal representing the magnitude and polarity of the minimum grid-to-cathode voltage normally required to fire the valve, and sixth circuit means connected to the fourth and fifth circuit means and responsive to the relative magnitudes and polarities of said fourth and said fifth electrical signals for producing a sixth electrical signal having a condition indicative of said relative magnitudes and polarities of said fourth and said fifth electrical signals; detector means connected to said third and said sixth circuit means so as to respond to said third and said sixth electrical signals and operative when said third and said sixth electrical signals simultaneously have conditions indicating respectively an anode-to-cathode voltage and a grid-to-cathode voltage in excess of the respective normal minimum voltages for firing the valve and of the requisite polarity therefor; and relay means, including time delay means, connected to said detector means so as to be responsive to the operation of said detector means when said operation is sustained for a period in excess of the normal firing delay of the valve.

2. Apparatus according to claim 1 wherein said first comparator means comprises an amplifier limiter circuit operative to produce said third electrical signal having the said condition when said anode-to-cathode voltage of the valve is more positive by a predetermined amount than said minimum anode-to-cathode voltage normally required to fire the valve.

3. Apparatus according to claim 1, wherein said second comparator means comprises an amplifier limiter circuit operative to produce said sixth electrical signal having the said condition when said grid-to-cathode voltage of the valve is more positive by a predetermined amount than said minimum grid-to-cathode voltage normally require to fire the valve.

4. Apparatus according to claim 1, including means, connected to the output of said relay means, for preserving an intermittent output signal from said relay means.

5. Appartaus according to claim 4, wherein said signal preserving means comprise an electro-magnetic counter.

6. Apparatus according to claim 4, wherein said signal preserving means comprise a bi-stable circuit.

7. Apparatus according to claim 1, including means for supplying the control grid of said valve with grid pulses having durations equal to the nominal conduction period of said valve.

No references cited.